ELECTRICAL PULSE COUNTING SYSTEMS

Filed May 28, 1965 4 Sheets-Sheet 1

Inventor
N. R. LAIDLAW
By Cameron, Kerkam & Sutton
Attorneys

Inventor
N. R. LAIDLAW
By Cameron, Kerkam & Sutton
Attorneys

Inventor
N. R. LAIDLAW
By Cameron, Kerkam & Sutton
Attorneys

Inventor
N. R. LAIDLAW
By Cameron, Kerkam & Sutton
Attorneys

United States Patent Office 3,383,499
Patented May 14, 1968

3,383,499

ELECTRICAL PULSE COUNTING SYSTEMS

Neil Rutherford Laidlaw, Edinburgh, Scotland, assignor to Ferranti Limited, Hollinwood, England, a company of Great Britain and Northern Ireland Filed May 28, 1965, Ser. No. 459,731
Claims priority, application Great Britain, May 30, 1964, 22,478/64
5 Claims. (Cl. 235—92)

This invention relates to electrical pulse counting systems of the type in which a single counter is required to accept pulses delivered over two or more channels.

A counter requires successive input pulses to be separate to at least some extent if it is to distinguish between them and not misoperate by counting only one pulse where two have been delivered. Obviously a pulse will be lost where two are delivered direct to the counter in coincidence, or even if they overlap without coinciding; but even if successive pulses are spaced apart, a counter requires them to be separated to at least a certain extent—hereinafter referred to as the acceptable minimum spacing—if neither is to be lost.

Where the input pulses are delivered over two channels to be added by a monodirectional counter, it may be practicable to arrange that in each channel, considered separately, the pulse spacing is at least the acceptable minimum, but difficulty will be experienced to avoid loss where the respective pulse trains are at random as regards one another so that a pulse in one channel may be followed to the counter by a pulse in the other channel at less than that spacing. Even if the pulse spacing in each channel is made twice the acceptable minimum, there will be loss unless each pulse of one train occurs midway between adjacent pulses of the other.

Where the counter is bidirectional and the pulses to be added are delivered over an Add pair of channels whereas those to be subtracted are delivered over a Subtract pair, and the difficulty just referred to is avoided as regards each pair of channels considered separately, a further difficulty may be experienced where the arrangements made to overcome the first difficulty would allow an Add pulse and a Subtract pulse to reach the counter at less than the acceptable minimum spacing.

An object of the invention is to provide a mono-directional counting system to accept input pulses received over two channels in which the first-mentioned difficulty is to a large extent overcome.

Another object is to provide a bidirectional counting system to accept pulses for addition over two channels and pulses for subtraction over another two in which both the difficulties discussed are to a large extent overcome.

In accordance with the present invention, a system to enable a counter to accept without loss electrical input pulses delivered over two input channels in each of which the pulse spacing is at least twice the minimum acceptable to the counter includes for each channel an input-pulse expanding stage for deriving from each input pulse in that channel an expanded input pulse the duration of which is not less than said acceptable minimum spacing and not greater than the difference between the minimum input pulse spacing and the minimum acceptable spacing, an Or-gating stage connected to the pulse expanding stages for combining the expanded pulses in a common channel, a first differentiating stage connected to the Or-gating stage for deriving a first edge pulse in synchronism with the leading edge of each pulse in said common channel, an And-gating stage connected to the pulse expanding stages for producing an And-gated pulse defined by the overlap in time of two expanded pulses, one from each channel, a second differentiating stage connected to the And-gating stage for deriving a second edge pulse in synchronism with the trailing edge of each And-gated pulse, stages connected to the pulse expanding stages for deriving a third edge pulse in synchronism with the trailing edge of each expanded input pulse, a delay stage connected to the last-mentioned stages for imparting to each of the third edge pulses a delay less than the duration of each expanded input pulse, a transmission gating stage connected to the Or-gating stage and to the delay stage for passing each delayed third edge pulse that occurs during the presence of a pulse in said common channel, and output connections from the differentiating stages and the transmission gating stage to the counter to pass as output pulses to its each of the first and second edge pulses and each edge pulse passed by the transmission gating stage.

In the accompanying drawings.

The invention will first be described by way of example as used for the counting without loss of electrical input pulses delivered over two channels to a monodirectional counter requiring a minimum spacing T between pulses, the pulses in each channel considered separately having at least twice that spacing. It is assumed—again, merely for the sake of example—that the input pulses have a width (duration) of 2 microseconds and that the minimum spacing is 10 microseconds.

Figure 1:
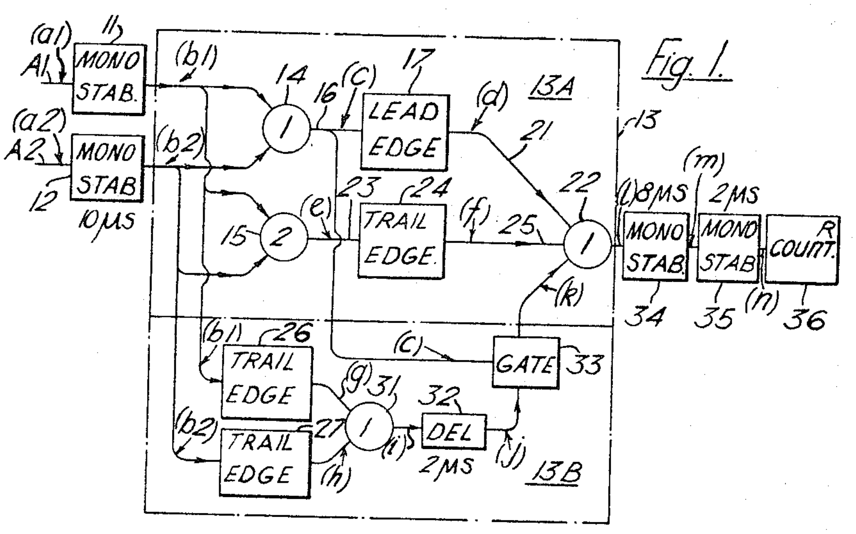
FIGURE 1 is a schematic diagram of one embodiment of the invention.

In carrying out the invention in accordance with this form, see FIG. 1, the two input channels are indicated by the references A1 and A2, since both trains have to be Added. Channel A1 includes a monostable stage 11 arranged to be triggered by the leading edge of each input pulse in the channel to generate an expanded input pulse the duration T of which is equal to the minimum spacing—10 microseconds. Channel A2 includes a similar input-pulse expanding stage 12 to generate an expanded input pulse of the same duration for each input pulses in that channel.

The two trains of expanded input pulses are applied to a pulse-ordering circuit which includes the equipment, about to be described, within the broken line 13. The circuit is divided into two sub-circuits 13A and 13B.

Sub-circuit 13A includes an Or-gating stage in the form of a two-entry Or gate 14 and an And-gating stage in the form of a two-entry And gate 15, to each of which both trains of expanded pulses are applied as inputs. The output from gate 14 is applied over a common channel 16 to a first differentiating stage 17 which differentiates with respect to time the leading edge of each pulse passed by the gate and so derives from each a first edge pulse; these are applied over a channel 21 as one of the inputs to a three-entry Or gate 22.

The output from gate 15 is applied over a channel 23 to a second differentiating stage 24, similar to stage 17, but operating on the trailing edge of each And-gated pulse passed by the gate and so deriving a train of second edge pulses for application over a channel 25 as the second input to gate 22.

Sub-circuit 13B includes two differentiating stages 26 and 27 arranged to receive the expanded input pulses from channels A1 and A2 respectively and derive edge pulses in synchronism with their trailing edges. Both these trains of edge pulses are combined by an Or gate 31 and applied by way of a delay stage 32 as the controlled input to a transmission gate 33. The delay imposed on each edge pulse by stage 32 is considerably less than the minimum acceptable spacing; a suitable value is 2 microseconds—the width of an input pulse. The control of gate 33 is derived from the common channel 16 so that a delayed edge pulse is passed by the gate only when it occurs during the presence of a pulse in the common channel. The delayed edge pulses which it passes are applied as the third input to gate 22.

The output from gate 22, constituting the output from circuit 13, is applied by way of monostable stages 34 and 35 to the counter 36. Stage 34 expands each edge pulse which it receives to a duration in excess of the delay imposed by stage 32 but less than the acceptable minimum; in the present example, 8 microseconds is a convenient value. Stage 35 is arranged to be triggered by the trailing edge of each pulse from output pulse expanding stage 34 and to thereupon generate a pulse of width approximately equal to the 2 microsecond width of each input pulse.

The operation of this equipment will now be described with reference to the waveforms of FIGS. 2 to 4.

Figure 2:
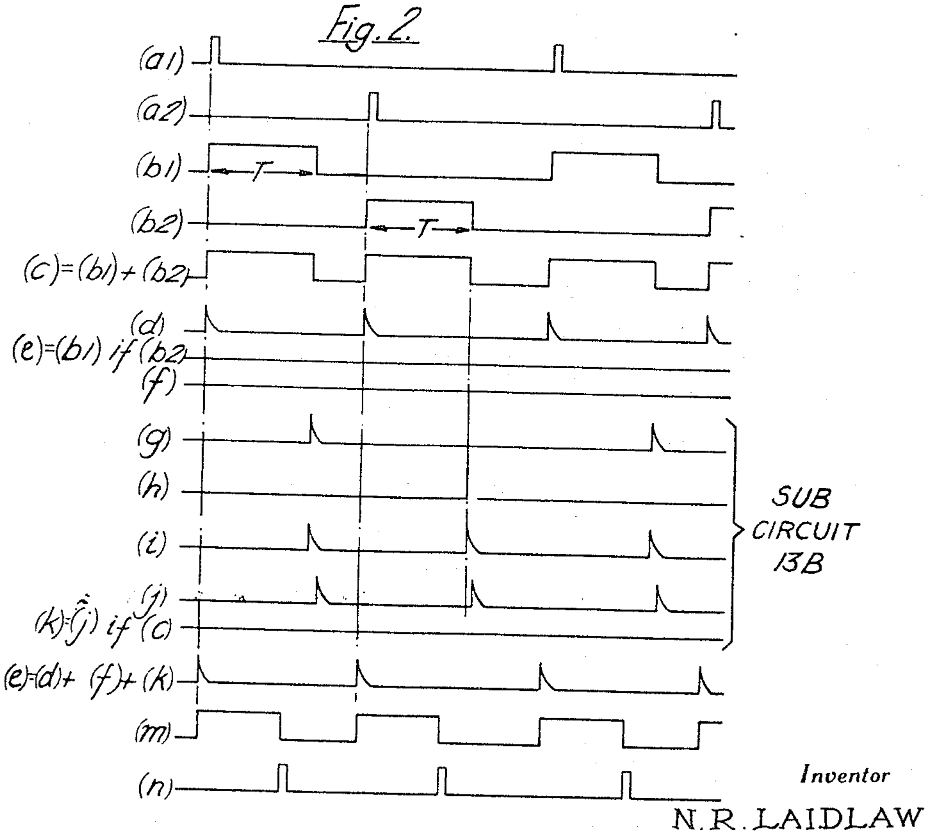
FIGURES 2 to 4 are waveforms to illustrate the operation of the embodiment of FIGURE 1.

FIG. 2 shows the waveforms occurring at the points indicated in FIG. 1 when each pulse in channel A1 is separated from the nearest pulse in channel A2 by at least the minimum spacing acceptable to the counter. At *a*1 and *a*2 are shown the respective trains of 2 microseconds input pulses in the two input channels, the corresponding outputs from stages 11 and 12 in the form of expanded input pulses of 10 microseconds duration (equal to the acceptable minimum spacing T) being shown at *b*1 and *b*2 respectively.

Gate 14 merely combines both trains of expanded pulses in the common channel 16, as shown at *c*, from which stage 17 derives in channel 21 an edge pulse in synchronism with each leading edge—waveform *d*.

As the pulses in each input channel have at least the acceptable minimum spacing with respect to the pulses in the other input channel, there is no overlap between the expanded pulses of the respective trains, hence there are no outputs from And gate 15 and the ensuing differentiating stage 24—waveforms *e* and *f*.

In sub-circuit 13B, stages 26 and 27 derive edge pulses in synchronism with the trailing edges of the expanded input pulses—waveforms *g* and *h*—and these are combined by gate 31—waveform *i*—and delayed by 2 microseconds by stage 32—waveform *j*.

As none of the delayed edge pulses of waveform *j* occur during the presence of a pulse in the common channel 14—waveform *c*—there is no output from gate 33—waveform *k*.

Thus the only one of the three inputs to gate 22 which carries edge pulses is channel 21, and the gate accordingly passes as output pulses the train *l*—derived from train *d*—to stage 34. Here each edge pulse is expanded to a duration of 8 microseconds—waveform *m*—from the trailing edge of each of these expanded output pulses is derived a 2 microsecond pulse—waveform *n*—for application to counter 36.

Thus the counter receives, in the shape of the pulses of train *n*, a pulse for each pulse of the input channels, the pulses applied to the counter having the same width—2 microseconds—as the input pulses. As the counter responds, indirectly, to the trailing edge of each pulse of waveform *m* and as those edges are spaced apart by more than the minimum acceptable spacing (because the input pulses from which they are derived have more than that spacing) the counter accepts them all without loss.

Figure 3:
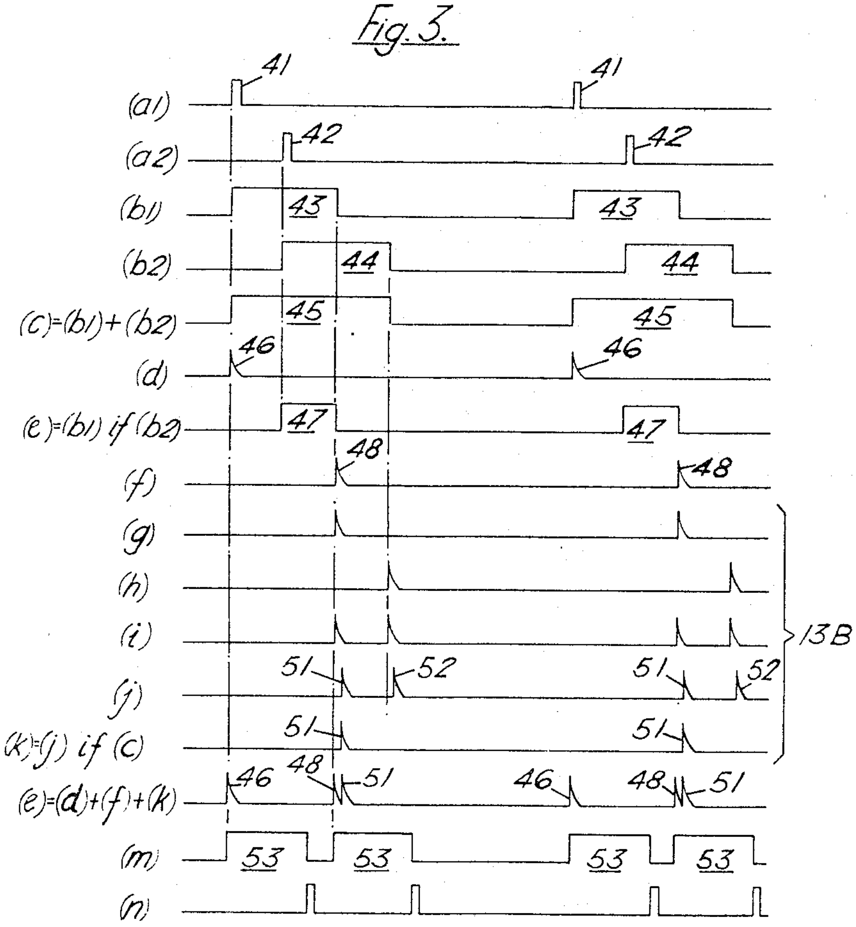
Figure 4:
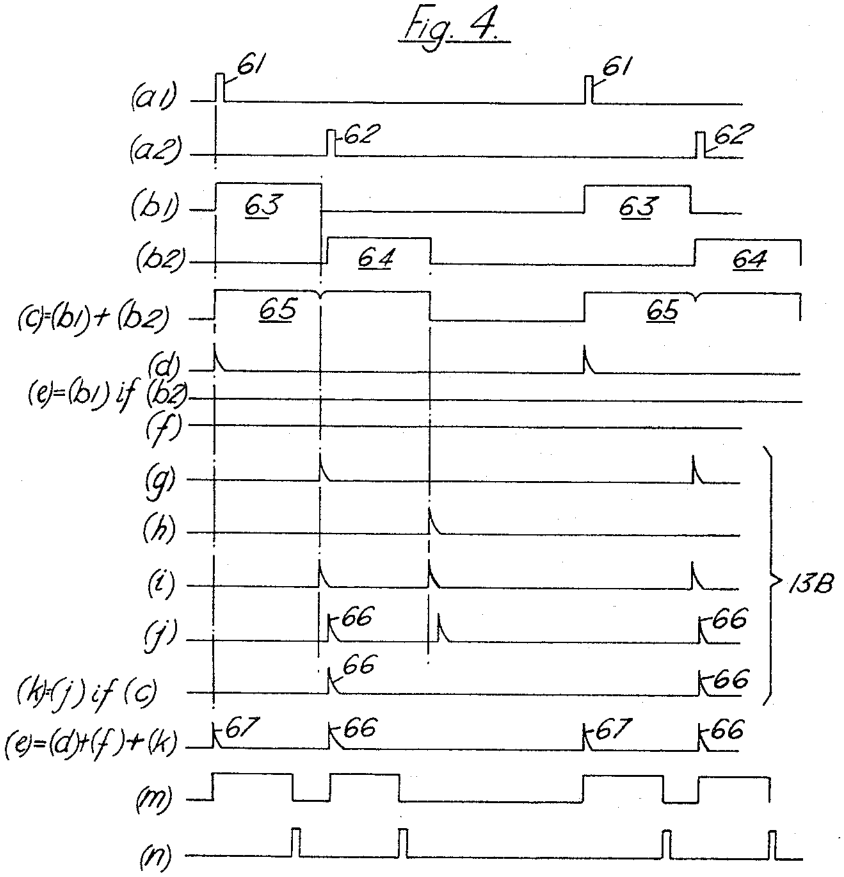

When the trains encroach on one another so that the input pulses arrive in pairs formed by one pulse from each channel at less then the acceptable minimum spacing from one another, the waveforms become as shown in FIG. 3. Here each pulse 41 of train *a*1 is followed by a pulse 42 of train *a*2 at less than the acceptable spacing.

Hence the corresponding expanded input pulses 43 and 44 of trains *b*1 and *b*2 overlap in time.

This overlap modifies the output from each of gates 14 and 15. From each pair of overlapping expanded pulses 43 and 44 gate 14 derives a single pulse 45—waveform *c*—defined by their overall span whereas gate 15 derives an And-gated pulse 47 defined by their overlap. Thus stage 17 derives (from each pulse 45) one edge pulse 46 for each input pulse pair—waveform *d*—whilst stage 24 also derives one pulse 48—waveform *f*—but from the trailing edge of each And-gated pulse 47 of waveform *e*.

In sub-circuit 13B the delayed edge pulses of waveform *j* are derived as before, but are spaced in pairs of pulses 51 and 52. This time, however, a pulse of this train—each pulse 51—occurs during the presence of a pulse 45 in the common channel 16 and so is passed by gate 33 towards gate 22.

Thus gate 22 reecives as inputs the edge pulses 46 and 48 of waveforms *d* and *f* over channels 21 and 25, and the delayed edge pulses 51, the waveform *l* of the output pulses from the gate having the modified form shown. As each unstable condition of stage 34 lasts longer than the delay imposed by stage 32, stage 34, on being triggered by each pulse 48 is irresponsive to the succeeding pulse 51 and so prevents it reaching the counter in expanded form. Thus a pulse 53 of train *m* is developed, and the counter responds to each input pulse as before. Again the trailing edges of pulses 53 of train *m*, which actuate the counter by way of stage 35, have at least the acceptable minimum spacing, since in this case those edges are defined by the leading and trailing edges of each pulse 43. Stage 34 is provided in order to make sure that the counter does not respond to the pulses 51; but the fact that the spacings between pulses 48 and 51 are much less than the acceptable minimum may allow stage 34 to be dispensed with.

It will be seen that sub-circuit 13B has so far served no useful purpose, and that in fact a stage 34 may be necessary to prevent misoperation due to it. This part of the equipment is provided to take care of the condition where pulses 61 and 62 (see FIG. 4) of input trains *a*1 and *a*2 are spaced so little beyond the acceptable minimum that gate 14 fails to separate the corresponding expanded pulses 63 and 64 and so produces from them a single pulse 65 as shown in waveform *c*. On the other hand, as the expanded pulses are in fact separate there is no response from gate 15—waveform *e*. Thus in the absence of subcircuit 13B the counter would receive only one output pulse for each input pulse pair, and the function of the subcircuit is to make good the pulse deficiency. This it does by means of each pulse 66 of waveform *j* which occurs during the presence of a pulse 65 in channel 16. Each of these pulses 66 is passed, together with the corresponding pulse 67 derived from the leading edge of pulse 65 as before, by way of stages 34 and 35 to the counter, which thus counts one pulse for each input pulse as before.

The operation of sub-circuit 13B may also be appreciated from a study of the waveforms of FIG. 3, for it is only the presence of a pulse 48 from gate 15 which, by generating a pulse 53 of waveform *m*, prevents the counter responding to the ensuing pulse 51, and in the special conditions considered there is no response from gate 15 and so pulse 48 is absent.

As regards the extent T to which stages 11 and 12 expand the input pulses, the minimum value is determined by the minimum spacing acceptable to the counter; if T is less than this, some pulses may be passed to the counter at spacings too short for it to accept. The maximum value is determined by the repetition frequency of the input pulses in the respective channels; each time an expanded pulse has been generated by one of stages 11 or 12, it cannot accept another input pulse from the channel concerned until it has been reset at the end of the time T. The maximum value of T should therefore not exceed the difference between the minimum spacing between the pulses in each channel considered separately and the minimum acceptable spacing. For least restraint on the pulse repetition frequency, therefore, T should have no more than the minimum acceptable duration.

Figure 5:
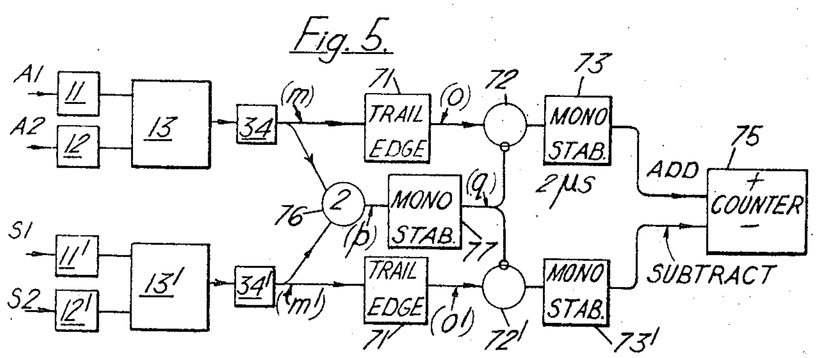
FIGURE 5 is a schematic diagram of another embodiment.

Similarly the width of the expanded output pulses 53 of waveform *m* should be sufficiently less than T, or less than the difference between the minimum input pulse spacing and T, whichever is the smaller, as to allow stage 34 to be reset before the arrival of the next pulse 48 or 46, as the case may be. The reason why the width of pulses 53 should exceed the delay imposed by stage 32 is to ensure that each unwanted pulse 51 falls clearly within the pulse 53 which was initiated by the preceding pulse 48.

Where the counter is bidirectional and, in addition to receiving pulses for addition over two channels, is required to receive pulses for subtraction over another two, an arrangement as shown in FIG. 5 may be used to prevent pulses being lost through an Add pulse and a Subtract pulse from the respective channel pairs being spaced at less than the acceptable minimum.

The input pulses for addition are applied over channels A1 and A2 to input-pulse expanding stages 11 and 12, again of 10 microseconds unstable condition, a pulse ordering circuit 13, and an output-pulse expanding stage 34, again of 8 microseconds unstable condition, as in the arrangement described with reference to FIG. 1. The input pulses for subtraction are applied over channels S1 and S2 to corresponding equipment indicated by the same reference primed. In each of the four channels, considered separately, the minimum pulse spacing is at least twice the duration of the expanded input pulses. Instead of being applied direct to the counter, the outputs from stages 34 and 34¹ are applied to it by connections, including gating means, now to be described.

The expanded output pulses from stage 34 are applied by way of a differentiating stage 71, arranged to derive an edge pulse from the trailing edge of each, as the controlled input to an Inhibit gate 72. The output from gate 72 is applied by way of a monostable stage 73 the unstable condition of which has a duration approximately equal to that of stage 35 of FIG. 1—that is, 2 microseconds—to the Add input of the counter 75. Similar equipment, indicated by the same references primed, is supplied between the Subtract channels and the counter.

The outputs from stages 34 and 34¹ are also applied as the two inputs to a two-entry And gate 76. The leading edge of each pulse passed by this gate is applied to trigger a monostable stage 77, which thereupon generates a pulse of 10 microsecond duration to be applied as the inhibiting control pulse to each of gates 72 and 72¹.

For a reason to be explained later, the acceptable minimum spacing for the counter 75 (whether of successive pulses of like or of unlike sense) is now the 8 microseconds of the unstable condition of steps 34 and 34¹, rather than 10 microseconds of stages 11, 11¹, 12, and 12¹.

Figure 6:
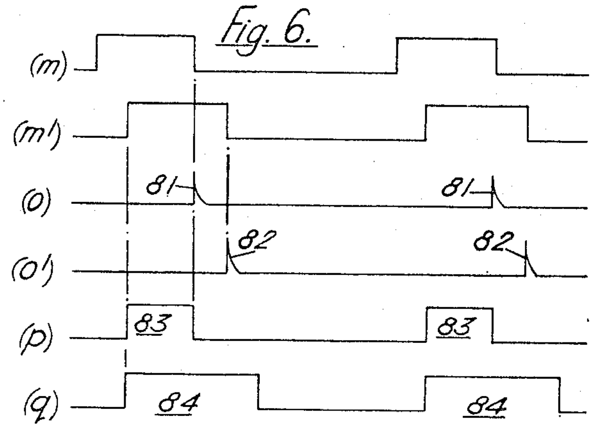
FIGURES 6 and 7 show waveforms to illustrate the operation of the embodiment of FIGURE 5.

In operation, assuming that in each pair of channels considered separately the input pulses are spaced wider than twice the 10 microseconds width of the pulses expanded by stages 11 and 12, or 11¹ and 12¹, as the case may be, but the pulses from one pair of channels encroach on the pulses from the other pair within the 8 microseconds minimum acceptable by the counter, the expanded output pulses from stages 34 and 34¹ will have waveforms of the kind shown at *m* and *m¹* in FIG. 6. The corresponding pulses derived from the trailing edges of those waveforms by stages 71 and 72 respectively are shown in waveforms *o* and *o¹*. Thus each pulse 81 of train *o* is to be added and each pulse 82 of train *o¹* is to be subtracted.

Gate 76 derives a combined pulse 83 of waveforms *p* defined by the overlap of the pulses of trains *m* and *m¹*. Stage 77 is triggered by the front edge of each pulse 83 and in response generates an inhibiting pulse 84 of waveform *q* to block both of gates 72 and 72¹ and 10 microseconds. It will be seen from the waveforms that each pair of Add and Subtract pulses 81 and 82, being at less than the acceptable minimum spacing, occur during the presence of an inhibiting pulse 84 and hence are prevented by the gates from reaching the counter. It will also be seen that as one pulse is to be added and the other subtracted, the suppression of the two does not result in any error in the counter reading. Thus, in effect, the pulses are not lost, for the counter's response is the same as if both had been delivered to it.

Figure 7:
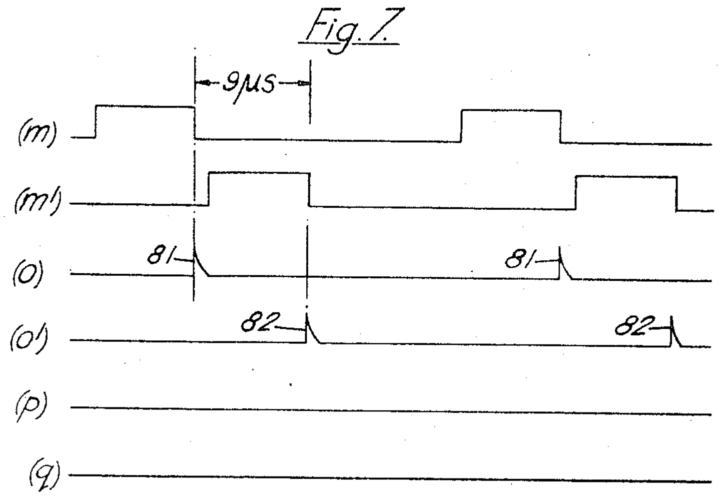

When on the other hand the pulses are acceptably spaced—at 9 microsecond intervals, say—the waveforms are as shown in FIG. 7. As the back edges of the respective expanded output pulses from stages 34 and 34¹ are now 9 microseconds apart and as each pulse has only a duration of 8 microseconds, there is no overlap of the respective pulses; hence gate 76 passes no signal to be converted to an inhibiting pulse by stage 77 and in consequence gates 72 and 72¹ remain open to pass the pulses of train *o* and *o¹* through to the counter.

The reason why in this arrangement the counter has to accept pulses at a minimum spacing equal to the unstable duration of stages 34 and 34¹, rather than that of stages 11, 11¹, 12, and 12¹, is that at any wider spacing the respective expanded output pulses from stages 34 and 34¹ do not overlap; thus none of the inhibiting pulses of train *q* are developed and in consequence the gates 72 and 72¹ are left open to pass the pulses of trains *o* and *o¹* through to the counter. The expanded input pulses of stages 11 and 12 of the Add channel must again be somewhat wider than the expanded output pulses of stage 34 so as to allow stage 34 to be reset in between successive pulses in that channel. Similarly with the Subtract channel. In each channel, therefore, as already explained, the minimum acceptable spacing is a little wider than twice that which is acceptable to the counter—in the above example 20 and 8 microseconds respectively.

What I claim is:

1. A system to enable a counter to accept without loss electrical input pulses delivered over two input channels in each of which the pulse spacing is at least twice the minimum acceptable to the counter including for each channel an input-pulse expanding stage for deriving from each input pulse in that channel an expanded input pulse the duration of which is not less than said acceptable minimum spacing and not greater than the difference between the minimum input pulse spacing and the minimum acceptable spacing, an Or-gating stage connected to the pulse expanding stages for combining the expanded pulses in a common channel, a first differentiating stage connected to the Or-gating stage for deriving a first edge pulse in synchronism with the leading edge of each pulse in said common channel, an And-gating stage connected to the pulse expanding stages for producing an And-gated pulse defined by the overlap in time of two expanded pulses, one from each channel, a second differentiating stage connected to the And-gating stage for deriving a second edge pulse in synchronism with the trailing edge of each And-gated pulse, stages connected to the pulse expanding stages for deriving a third edge pulse in synchronism with the trailing edge of each expanded input pulse, a delay stage connected to the last-mentioned stages for imparting to each of the third edge pulses a delay less than the duration of each expanded input pulse, a transmission gating stage connected to the Or-gating stage and to the delay stage for passing each delayed third edge pulse that occurs during the presence of a pulse in said common channel, and output connections from the differentiating stages and the transmission gating stage to the counter to pass as output pulses to it each of the first and second edge pulses and each edge pulse passed by the transmission gating stages.

2. A system as claimed in claim 1 wherein the output connections include an output-pulse expanding stage connected to the differentiating stages and to the transmission gating stage for expanding the pulses from them to a duration in excess of said delay but less than that of the expanded input pulses or less than said difference between the minimum input pulse spacing and minimum acceptable spacing, whichever is the smaller, a stage connected to the output-pulse expanding stage for deriving from an edge of each expanded output pulse a pulse of width approximately equal to that of the input pulses, and connections for applying the pulses so derived to the counter.

3. A system to enable a bidirectional counter to accept without effective loss electrical input pulses delivered for addition over one pair of input channels and for subtraction over a further pair of input channels, in each of which channels the pulse spacing is of at least twice a duration greater than the minimum acceptable to the counter including for each channel an input-pulse expanding stage for deriving from each input pulse in that channel an expanded input pulse of said duration, for each pair of channels an Or-gating stage connected to the pulse expanding stages of those two channels for combining the expanded pulses from them in a channel common to that pair of channels, a first differentiating stage connected to the Or-gating stage for deriving a first edge pulse in synchronism with the leading edge of each pulse in said common channel, an And-gating stage connected to the pulse expanding stages of those two channels for producing an And-gated pulse defined by the overlap in time of two expanded pulses, one from each channel, a second differentiating stage connected to the And-gating stage for deriving a second edge pulse in synchronism with the trailing edge of each And-gated pulse, stages connected to the pulse expanding stages of those two channels for deriving a third edge pulse in synchronism with the trailing edge of each expanded input pulse, a delay stage connected to the last-mentioned stages for imparting to each of the third edge pulses a delay less than the duration of each expanded input pulse, a transmission gating stage connected to the Or-gating stage and to the delay stage for passing each delayed third edge pulse that occurs during the presence of a pulse in said common channel, an output-pulse expanding stage, connections from the differentiating stages and from the transmission gating stage to the output-pulse expanding stage to pass to it each of the first and second edge pulses and each edge pulse passed by the transmission gating stage, the output pulse expanding stage being arranged to derive from pulses so passed to it expanded output pulses of duration equal to the minimum spacing acceptable to the counter, connections from the output-pulse expanding stage of each pair of channels to the counter, and, common to both pairs of input channels, gating means included in those connections for suppressing under the control of the expanded output pulses any two input pulses, one to be added and the other subtracted, the spacing between which is less than said acceptable minimum.

4. A system as claimed in claim 3 wherein for each pair of channels said connections include a stage connected to the output-pulse expanding stage for deriving a pulse in synchronism with the trailing edge of each expanded output pulse, and said gating means includes an Inhibit gate connected between that pulse-deriving stage and the counter.

5. A system as claimed in claim 4 wherein the gating means includes for both pairs of channels in common an And-gating stage connected to both output-pulse expanding stages for deriving a combined pulse defined by the overlap in time of two expanded output pulses, one from each channel pair, a stage connected to the last-mentioned And-gating stage for deriving from each combined pulse and inhibiting pulse of duration equal to that of the expanded input pulses and starting in synchronism with the leading edge of the combined pulse, and connections for applying each inhibiting pulse to the control input of each Inhibit gate.

References Cited

UNITED STATES PATENTS

| | | | |
|---|---|---|---|
| 3,211,087 | 10/1965 | Sapino | 328—58 X |
| 3,263,090 | 7/1966 | Blocher | 328—58 X |
| 3,317,745 | 5/1967 | Scharf | 328—58 X |

MAYNARD R. WILBUR, *Primary Examiner.*

G. J. MAIER, *Assistant Examiner.*